(12) United States Patent
Gordon et al.

(10) Patent No.: US 10,126,744 B2
(45) Date of Patent: Nov. 13, 2018

(54) SELF-DRIVING VEHICLE LUGGAGE AND BELONGINGS MANAGEMENT

(71) Applicant: International Business Machines Corporation, Armonk, NY (US)

(72) Inventors: Michael S. Gordon, Yorktown Heights, NY (US); Ashish Kundu, Elmsford, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/425,051

(22) Filed: Feb. 6, 2017

(65) Prior Publication Data

US 2018/0224849 A1 Aug. 9, 2018

(51) Int. Cl.
*G05D 1/00* (2006.01)
*B60W 50/14* (2012.01)
(Continued)

(52) U.S. Cl.
CPC ........... *G05D 1/0088* (2013.01); *B60W 50/14* (2013.01); *G06K 9/00832* (2013.01);
(Continued)

(58) Field of Classification Search
CPC ............. G05D 1/0088; G06K 9/00832; G06K 9/6201; G08B 21/24; G08B 1/08; B60W 50/14; B60W 2420/42
See application file for complete search history.

(56) References Cited

U.S. PATENT DOCUMENTS

| 4,665,395 A | 5/1987 | Van Ness |
| 4,908,988 A | 3/1990 | Yamamura et al. |

(Continued)

FOREIGN PATENT DOCUMENTS

| CN | 1135063 | 11/1996 |
| CN | 2349068 Y | 11/1999 |

(Continued)

OTHER PUBLICATIONS

Anonymous, 'System and Method to Target Advertisements for the Right Focus Group'. IP.com, No. 000218285, May 31, 2012, pp. 1-2.

(Continued)

*Primary Examiner* — Dale W Hilgendorf
(74) *Attorney, Agent, or Firm* — Law Office of Jim Boice

(57) ABSTRACT

A method manages a possession of a passenger of a self-driving vehicle (SDV). One or more processors identify a passenger type of the passenger and a possession type of the possession. One or more processors adjust a possession monitoring system in the SDV based on the passenger type and the possession type, such that adjusting the possession monitoring system modifies an SDV vigilance level V of the possession monitoring system in the SDV to create an adjusted possession monitoring system. One or more processors receive an evaluation of the possession from the adjusted possession monitoring system, and then determine a problem with the possession based on the evaluation of the possession from the adjusted possession monitoring system. One or more processors then adjust an operation of the SDV based on the determined problem with the possession of the passenger of the SDV.

17 Claims, 6 Drawing Sheets

US 10,126,744 B2
Page 2

(51) Int. Cl.
  *G08B 21/24* (2006.01)
  *G06K 9/00* (2006.01)
  *G06K 9/62* (2006.01)
  *G08B 1/08* (2006.01)

(52) U.S. Cl.
  CPC ........... *G06K 9/6201* (2013.01); *G08B 21/24* (2013.01); *B60W 2420/42* (2013.01); *G08B 1/08* (2013.01)

(56) References Cited

U.S. PATENT DOCUMENTS

| | | |
|---|---|---|
| 5,975,791 A | 11/1999 | McCulloch |
| 6,064,970 A | 5/2000 | McMillian et al. |
| 6,201,318 B1 | 3/2001 | Guillory |
| 6,326,903 B1 | 12/2001 | Gross et al. |
| 6,393,362 B1 | 5/2002 | Burns |
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 6,810,312 B2 | 10/2004 | Jammu et al. |
| 7,124,088 B2 | 10/2006 | Bauer et al. |
| 7,580,782 B2 | 8/2009 | Breed et al. |
| 7,769,544 B2 | 8/2010 | Blesener et al. |
| 7,877,269 B2 | 1/2011 | Bauer et al. |
| 7,894,951 B2 | 2/2011 | Norris et al. |
| 7,979,173 B2 | 7/2011 | Breed |
| 8,031,062 B2 | 10/2011 | Smith |
| 8,045,455 B1 | 10/2011 | Agronow et al. |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,146,703 B2 | 4/2012 | Baumann et al. |
| 8,152,325 B2 | 4/2012 | McDermott |
| 8,180,322 B2 | 5/2012 | Lin et al. |
| 8,346,480 B2 | 1/2013 | Trepagnier et al. |
| 8,352,112 B2 | 1/2013 | Mudalige |
| 8,442,854 B2 | 5/2013 | Lawton et al. |
| 8,466,807 B2 | 6/2013 | Mudalige |
| 8,489,434 B1 | 7/2013 | Otis et al. |
| 8,583,365 B2 | 11/2013 | Jang et al. |
| 8,660,734 B2 | 2/2014 | Zhu et al. |
| 8,676,466 B2 | 3/2014 | Mudalige |
| 8,678,701 B1 | 3/2014 | Aldasem |
| 8,786,461 B1 | 7/2014 | Daudelin |
| 8,810,392 B1* | 8/2014 | Teller et al. ........... G08B 21/24 340/539.32 |
| 8,816,857 B2 | 8/2014 | Nordin et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,970,362 B2* | 3/2015 | Morley et al. ......... G08B 21/22 |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,024,787 B2 | 5/2015 | Alshinnawi et al. |
| 9,123,049 B2 | 9/2015 | Hyde et al. |
| 9,170,327 B2 | 10/2015 | Choe et al. |
| 9,189,897 B1 | 11/2015 | Stenneth |
| 9,194,168 B1 | 11/2015 | Lu et al. |
| 9,216,745 B2 | 12/2015 | Beardsley et al. |
| 9,218,698 B2 | 12/2015 | Ricci |
| 9,286,520 B1 | 3/2016 | Lo et al. |
| 9,317,033 B2 | 4/2016 | Ibanez-guzman et al. |
| 9,390,451 B1 | 7/2016 | Slusar |
| 9,399,472 B2 | 7/2016 | Minoiu-Enache |
| 9,463,805 B2 | 10/2016 | Kirsch et al. |
| 9,483,948 B1 | 11/2016 | Gordon et al. |
| 9,552,735 B2 | 1/2017 | Pilutti et al. |
| 9,566,958 B2 | 2/2017 | Waldmann |
| 9,566,986 B1 | 2/2017 | Gordon et al. |
| 9,628,975 B1 | 4/2017 | Watkins et al. |
| 9,646,496 B1 | 5/2017 | Miller |
| 9,834,224 B2 | 12/2017 | Gordon et al. |
| 2002/0026841 A1 | 3/2002 | Svendsen |
| 2002/0128774 A1 | 9/2002 | Takezaki et al. |
| 2003/0065572 A1 | 4/2003 | McNee et al. |
| 2003/0076981 A1 | 4/2003 | Smith et al. |
| 2004/0078133 A1 | 4/2004 | Miller |
| 2004/0199306 A1* | 10/2004 | Heimann et al. .... G05D 1/0278 701/23 |
| 2005/0021227 A1 | 1/2005 | Matsumoto et al. |
| 2005/0104745 A1 | 5/2005 | Bachelder et al. |
| 2006/0106671 A1 | 5/2006 | Biet |
| 2006/0163939 A1 | 7/2006 | Kuramochi et al. |
| 2006/0200379 A1 | 9/2006 | Biet |
| 2006/0241855 A1 | 10/2006 | Joe et al. |
| 2007/0100687 A1 | 5/2007 | Yoshikawa |
| 2007/0124027 A1 | 5/2007 | Betzitza et al. |
| 2008/0048850 A1 | 2/2008 | Yamada |
| 2008/0065293 A1 | 3/2008 | Placke et al. |
| 2008/0114663 A1 | 5/2008 | Watkins et al. |
| 2008/0129475 A1 | 6/2008 | Breed et al. |
| 2008/0201217 A1 | 8/2008 | Bader et al. |
| 2008/0288406 A1 | 11/2008 | Seguin et al. |
| 2009/0094109 A1 | 4/2009 | Aaronson et al. |
| 2009/0138168 A1 | 5/2009 | Labuhn et al. |
| 2009/0248231 A1 | 10/2009 | Kamiya |
| 2009/0313096 A1 | 12/2009 | Kama |
| 2010/0057511 A1 | 3/2010 | Mansouri et al. |
| 2010/0156672 A1 | 6/2010 | Yoo et al. |
| 2010/0179720 A1 | 7/2010 | Lin et al. |
| 2010/0228427 A1 | 9/2010 | Anderson et al. |
| 2010/0256852 A1 | 10/2010 | Mudalige |
| 2011/0029173 A1 | 2/2011 | Hyde et al. |
| 2011/0035250 A1 | 2/2011 | Finucan |
| 2011/0077807 A1 | 3/2011 | Hyde et al. |
| 2011/0077808 A1 | 3/2011 | Hyde et al. |
| 2011/0137699 A1 | 6/2011 | Ben-Ari et al. |
| 2011/0264521 A1 | 10/2011 | Straka |
| 2012/0072243 A1 | 3/2012 | Collins et al. |
| 2012/0139756 A1 | 6/2012 | Djurkovic |
| 2012/0277947 A1 | 11/2012 | Boehringer et al. |
| 2012/0293341 A1* | 11/2012 | Lin ........................ B60R 25/00 340/539.13 |
| 2013/0030657 A1 | 1/2013 | Chatterjee et al. |
| 2013/0113634 A1 | 5/2013 | Hutchinson et al. |
| 2013/0131949 A1 | 5/2013 | Shida |
| 2013/0144502 A1 | 6/2013 | Shida |
| 2013/0231824 A1 | 9/2013 | Wilson et al. |
| 2013/0261871 A1 | 10/2013 | Hobbs et al. |
| 2014/0019259 A1 | 1/2014 | Dung et al. |
| 2014/0092332 A1 | 4/2014 | Price |
| 2014/0095214 A1 | 4/2014 | Mathe et al. |
| 2014/0129073 A1 | 5/2014 | Ferguson |
| 2014/0136045 A1 | 5/2014 | Zhu et al. |
| 2014/0136414 A1 | 5/2014 | Abhyanker |
| 2014/0164126 A1 | 6/2014 | Nicholas et al. |
| 2014/0188999 A1 | 7/2014 | Leonard et al. |
| 2014/0195213 A1 | 7/2014 | Kozloski et al. |
| 2014/0201037 A1 | 7/2014 | Mallawarachchi et al. |
| 2014/0201126 A1 | 7/2014 | Zadeh |
| 2014/0214255 A1 | 7/2014 | Dolgov et al. |
| 2014/0214260 A1 | 7/2014 | Eckert et al. |
| 2014/0222277 A1 | 8/2014 | Tsimhoni et al. |
| 2014/0222577 A1 | 8/2014 | Abhyanker |
| 2014/0282967 A1 | 9/2014 | Maguire |
| 2014/0297116 A1 | 10/2014 | Anderson et al. |
| 2014/0306833 A1 | 10/2014 | Ricci |
| 2014/0309789 A1 | 10/2014 | Ricci |
| 2014/0309806 A1 | 10/2014 | Ricci |
| 2014/0309864 A1 | 10/2014 | Ricci |
| 2014/0309891 A1 | 10/2014 | Ricci |
| 2014/0310186 A1 | 10/2014 | Ricci |
| 2014/0316671 A1 | 10/2014 | Okamoto |

(56) References Cited

U.S. PATENT DOCUMENTS

| | | | |
|---|---|---|---|
| 2014/0324268 A1 | 10/2014 | Montemerlo et al. | |
| 2014/0330479 A1 | 11/2014 | Dolgov | |
| 2014/0358331 A1 | 12/2014 | Prada Gomez et al. | |
| 2014/0358353 A1 | 12/2014 | Ibanez-Guzman et al. | |
| 2015/0006005 A1 | 1/2015 | Yu et al. | |
| 2015/0006014 A1 | 1/2015 | Wimmer et al. | |
| 2015/0026092 A1 | 1/2015 | Abboud et al. | |
| 2015/0035685 A1 | 2/2015 | Strickland et al. | |
| 2015/0051778 A1 | 2/2015 | Mueller | |
| 2015/0057891 A1 | 2/2015 | Mudalige et al. | |
| 2015/0062340 A1 | 3/2015 | Datta et al. | |
| 2015/0062469 A1 | 3/2015 | Fleury | |
| 2015/0066282 A1 | 3/2015 | Yopp | |
| 2015/0066284 A1 | 3/2015 | Yopp | |
| 2015/0070178 A1 | 3/2015 | Kline | |
| 2015/0088358 A1 | 3/2015 | Yopp | |
| 2015/0095190 A1 | 4/2015 | Hammad et al. | |
| 2015/0120331 A1 | 4/2015 | Russo et al. | |
| 2015/0134178 A1 | 5/2015 | Minoiu-Enache | |
| 2015/0137985 A1* | 5/2015 | Zafiroglu et al. | G08B 21/24 340/686.1 |
| 2015/0141043 A1 | 5/2015 | Abramson | |
| 2015/0149018 A1 | 5/2015 | Attard et al. | |
| 2015/0149021 A1 | 5/2015 | Duncan et al. | |
| 2015/0160019 A1 | 6/2015 | Biswal et al. | |
| 2015/0166059 A1 | 6/2015 | Ko | |
| 2015/0196256 A1 | 7/2015 | Venkatraman et al. | |
| 2015/0232065 A1 | 8/2015 | Ricci et al. | |
| 2015/0242953 A1 | 8/2015 | Suiter | |
| 2015/0293994 A1 | 10/2015 | Kelly | |
| 2015/0338226 A1 | 11/2015 | Mason et al. | |
| 2015/0339639 A1 | 11/2015 | Choe | |
| 2016/0001781 A1 | 1/2016 | Fling et al. | |
| 2016/0026182 A1 | 1/2016 | Boroditsky et al. | |
| 2016/0075512 A1 | 3/2016 | Lert, Jr. | |
| 2016/0078695 A1 | 3/2016 | McClintic et al. | |
| 2016/0078758 A1 | 3/2016 | Basalamah | |
| 2016/0090100 A1 | 3/2016 | Oyama et al. | |
| 2016/0139594 A1 | 5/2016 | Okumura et al. | |
| 2016/0140507 A1 | 5/2016 | Stevens et al. | |
| 2016/0176409 A1 | 6/2016 | Kirsch et al. | |
| 2016/0202700 A1 | 7/2016 | Sprigg | |
| 2016/0205146 A1 | 7/2016 | Sugioka et al. | |
| 2016/0303969 A1 | 10/2016 | Akula | |
| 2016/0334797 A1 | 11/2016 | Ross et al. | |
| 2016/0344737 A1 | 11/2016 | Anton | |
| 2016/0355192 A1 | 12/2016 | James et al. | |
| 2016/0364823 A1 | 12/2016 | Cao | |
| 2017/0001650 A1 | 1/2017 | Park | |
| 2017/0010613 A1 | 1/2017 | Fukumoto | |
| 2017/0021830 A1 | 1/2017 | Feldman et al. | |
| 2017/0021837 A1 | 1/2017 | Ebina | |
| 2017/0057542 A1 | 3/2017 | Kim et al. | |
| 2017/0088143 A1 | 3/2017 | Goldman-Shenhar et al. | |
| 2017/0106876 A1 | 4/2017 | Gordon et al. | |
| 2017/0123428 A1 | 5/2017 | Levinson et al. | |
| 2017/0129487 A1 | 5/2017 | Wulf | |
| 2017/0151958 A1 | 6/2017 | Sakuma | |
| 2017/0168689 A1 | 6/2017 | Goldman-Shenhar et al. | |
| 2017/0200449 A1 | 7/2017 | Penilla et al. | |

FOREIGN PATENT DOCUMENTS

| | | |
|---|---|---|
| CN | 201004265 Y | 1/2008 |
| CN | 202012052 | 10/2011 |
| CN | 202038228 U | 11/2011 |
| CN | 102650882 | 8/2012 |
| CN | 202772924 | 3/2013 |
| CN | 104900018 A | 9/2015 |
| EP | 0582236 | 2/1994 |
| WO | 2014058263 | 4/2014 |
| WO | 2014066721 | 5/2014 |
| WO | 2014147361 | 9/2014 |
| WO | 2014148975 | 9/2014 |
| WO | 2014148976 | 9/2014 |
| WO | 2015024616 | 2/2015 |
| WO | 2015056105 | 4/2015 |

OTHER PUBLICATIONS

Anonymous, "Car Built-In Mechanism to Enforce Mandatory Self-Driving Mode", IP.com, No. 000234916, Feb. 14, 2014, pp. 1-3.

T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.

J. Miller, "Self-Driving Car Technology's Benefits, Potential Risks, and Solutions", The Energy Collective, theenergycollective.com, Aug. 19, 2014, pp. 1-7.

Chen S, et al., "A Crash Risk Assessment Model for ROAS Curves". Inproceedings 20th International Technical Conference on the Enhanced Saftey of Vehicles., 2007. Lyon, France.

J. Wei et al., "Towards a Viable Autonomous Driving Research Platform", IEEE, Intelligent Vehicles Symposium (IV), 2013, pp. 1-8.

Anonymous, "Diagnostics Mechanism for Self-Driving Cars to Validate Self-Driving Capabilites", IP.com, Jun. 6, 2014, pp. 1-5, IP.com.

Brownell, "Shared Autonomous Taxi Networks: An Analysis of Transportation Demand in NJ and a 21st Century Solution for Congestion", Dissertation, Princeton University, 2013, pp. 1-122.

Sessa et al, "Blueprint of Alternative City Cyber-Mobility Take-U Scenarios", Seventh Framework Programme Theme SST.2012.3.1-4, Automated Urban Vehicles Collaborative Project—Grant Agreement No. 314190, 2013, pp. 1-63.

Lutin et al., "The Revolutionary Development of Self-Driving Vehicles and Implications for the Transportation Engineering Profession", ITE Journal 83.7, 2013, pp. 28-32.

A. Hars, "Self-Driving Cars: The Digital Transformation of Mobility", Marktplatze im Umbruch, Springer Berlin Heidelberg, 2015, pp. 539-549.

Jimenez et al.; "Autonomous collision avoidance system based on accurate knowledge of the vehicle surroundings"; Inst Engineering Technology—IET; IET Intelligent Transport Systems vol. 9, No. 1, pp. 105-117; 2015; England.

Anonymous, "Avoiding Crashes With Self-Driving Cars: Today's Crash-Avoidance Systems are the Mile Markers to Tomorrow's Autonomous Vehicles". Consumer Reports Magazine, Feb. 2014. Web. Sep. 22, 2016. <http://www.consumerreports.org/cro/magazine/2014/04/the-road-to-self-driving-cars/index.htm>.

Anonymous, "Google Files Patent for Second-Gen Autonomous Vehicle Without a Steering Wheel, Brake Pedal & More". patentlymobile.com, Nov. 27, 2015. Web. Sep. 22, 2016. <http://www.patentlymobile.com/2015/11/google-files-patent-for-second-gen-autonomous-vehicle-without-a-steering-wheel-brake-pedal-more.html>.

C. Berger et al., "Cots-Architecture With a Real-Time OS for a Self-Driving Miniature Vehicle", SAFECOMP 2013—Workshop ASCOMS of the 32nd International Conference on Computer Safety, Reliability and Security, Sep. 2013, Toulouse, France, pp. 1-13.

Chan, Sewell. "Left Something in a Cab? Good Luck Getting It Back." The New York Times Company, nytimes.com, Cityroom Blog, Aug. 13, 2007. Web. Sep. 22, 2016. <http://cityroom.blogs.nytimes.com/2007/08/13/left-something-in-a-cab-good-luck-getting-it-back/>.

Fanelli, James. "Gold Bars and a Dead Man's Ashes Among Odd Items People Left Behind in Cabs". dnainfo.com, May 5, 2014. Web. Sep. 22, 2016. <https://www.dnainfo.com/new-york/20140505/midtown/dog-dead-mans-ashes-among-odd-items-people-left-behind-taxis>.

Anonymous, "Don't Panic: 4 Steps to Take If You Leave Something in a Cab". yellowcabaz.com, Apr. 28, 2015, Web. Sep. 22, 2016. <http://www.yellowcabaz.com/dont-panic-4-steps-to-take-if-you-leave-something-in-a-cab/>.

(56) References Cited

OTHER PUBLICATIONS

P. Mell et al., "The NIST Definition of Cloud Computing", National Institute of Standards and Technology, Information Technology Laboratory, Sep. 2011, pp. 1-7.

* cited by examiner

SELF-DRIVING VEHICLE LUGGAGE AND BELONGINGS MANAGEMENT

BACKGROUND

The present invention relates to the field of vehicles, and specifically to the field of self-driving vehicles. Still more specifically, the present invention relates to the field of using self-driving vehicles and the luggage/belongings of passengers of the self-driving vehicles.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

In one or more embodiments of the present invention, a method manages a possession of a passenger of a self-driving vehicle. One or more processors assess a passenger of a self-driving vehicle (SDV) in order to identify a passenger type of the passenger. One or more processors assess a possession of the passenger of the SDV in order to identify a possession type of the possession. One or more processors adjust a possession monitoring system in the SDV based on the passenger type and the possession type, such that adjusting the possession monitoring system modifies an SDV vigilance level V of the possession monitoring system in the SDV to create an adjusted possession monitoring system. One or more processors receive an evaluation of the possession from the adjusted possession monitoring system, and then determine a problem with the possession based on the evaluation of the possession from the adjusted possession monitoring system. One or more processors then adjust an operation of the SDV based on the determined problem with the possession of the passenger of the SDV.

In one or more embodiments of the present invention, the method is implemented as a computer program product and/or in a system.

DETAILED DESCRIPTION

Figure 1:
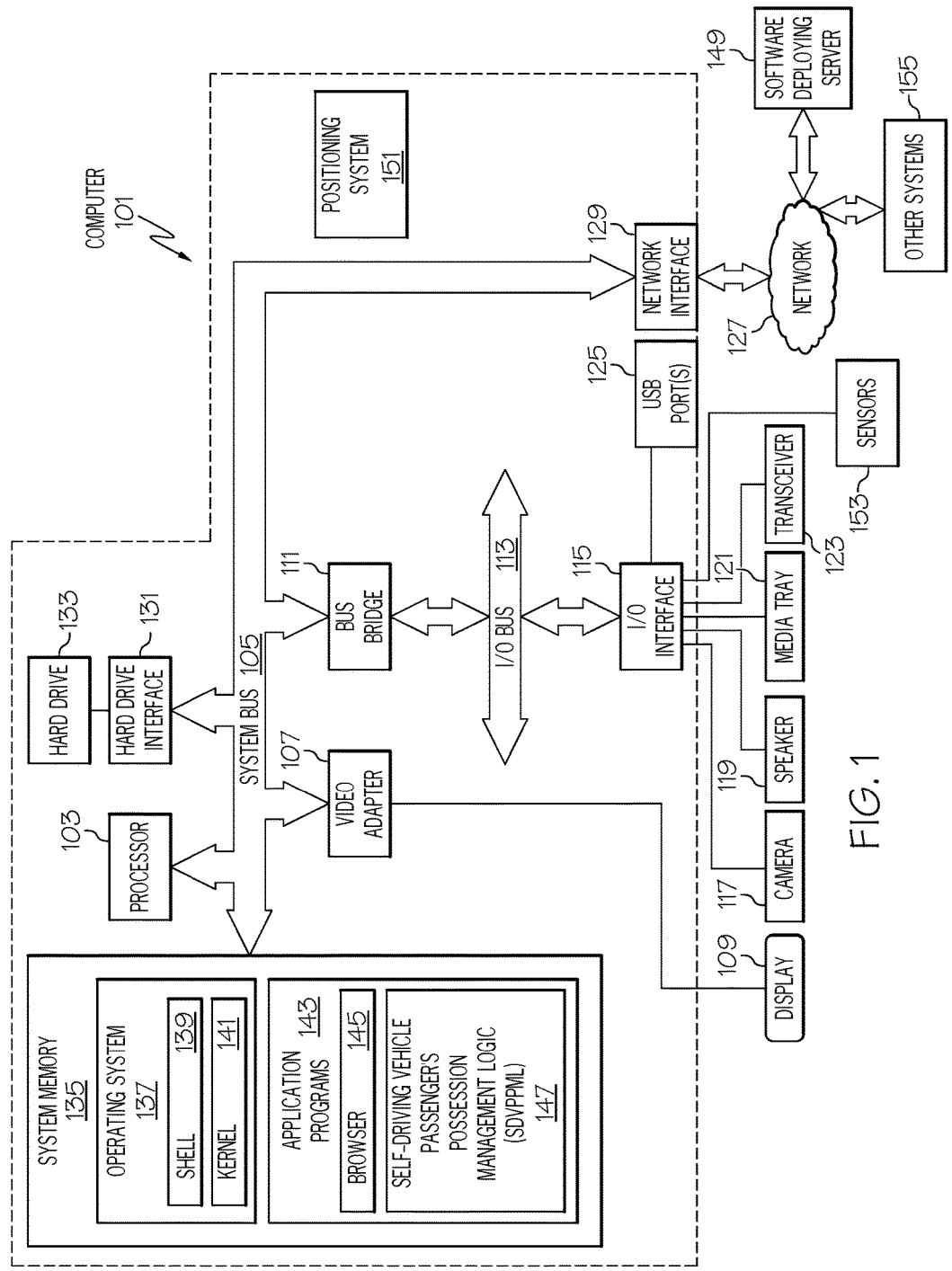
FIG. 1 depicts an exemplary system and network in which the present invention may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as JAVA, SMALL-TALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be implemented within software deploying server 149 and/or other systems 155 shown in FIG. 1, and/or monitoring computer 201 and/or possession monitoring system 214 shown in FIG. 2, and/or a self-driving vehicle (SDV) on-board computer 301 shown in FIG. 3.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a camera 117 (capable of taking digital photographs and/or videos), a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

Figure 2:
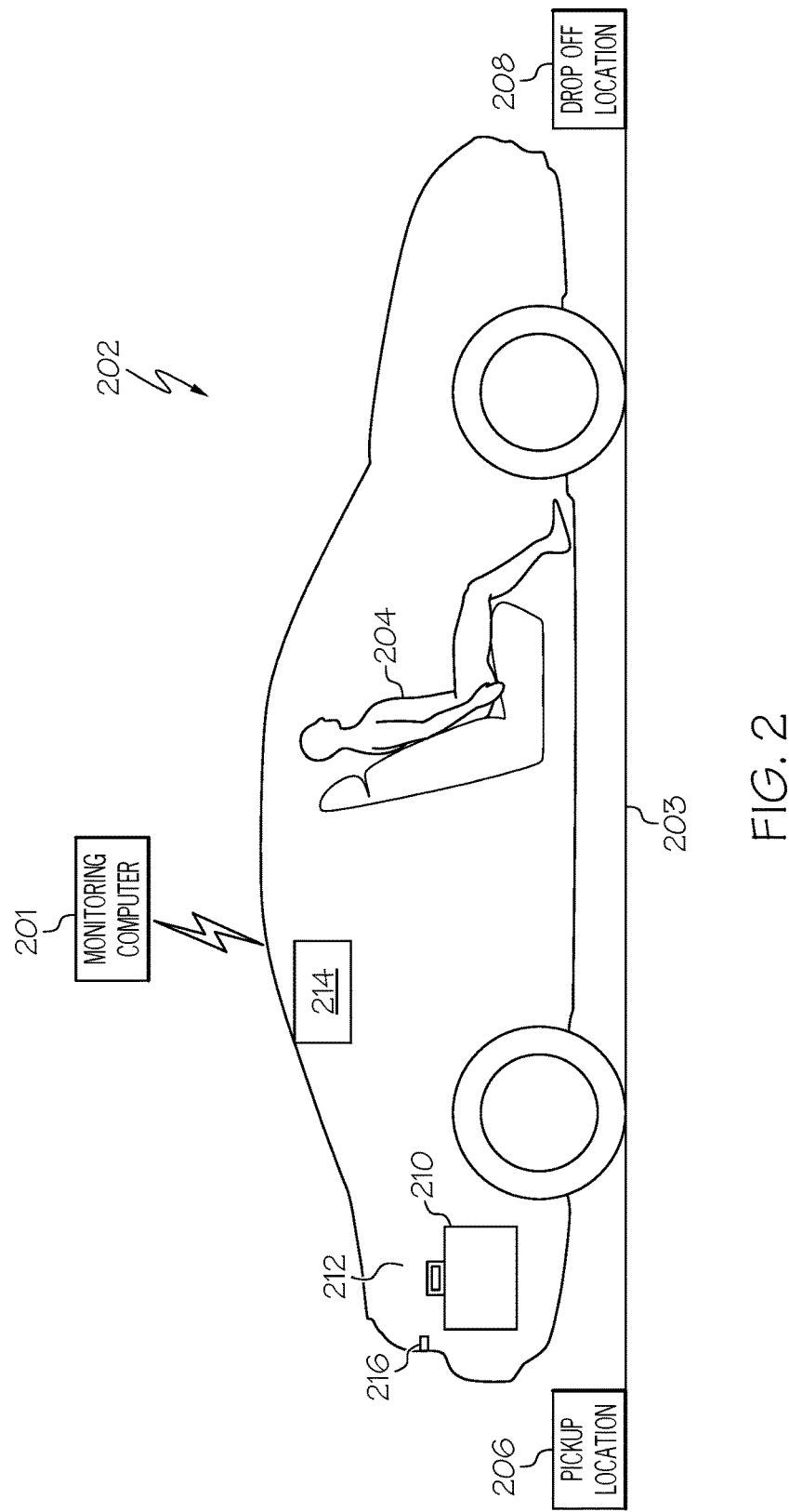
FIG. 2 illustrates an exemplary self-driving vehicle (SDV) delivering a passenger and the passenger's possession to a drop off location in accordance with one or more embodiments of the present invention.

As depicted, computer 101 is able to communicate with a software deploying server 149 and/or other systems 155 (e.g., establishing communication between monitoring computer 201 and SDV 202 shown in FIG. 2) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Self-Driving Vehicle Passenger's Possession Management Logic (SDVPPML) 147. SDVPPML 147 includes code for implementing the processes described below, including those described in FIGS. 2-4. In one embodiment, computer 101 is able to download SDVPPML 147 from software deploying server 149, including in an on-demand basis, wherein the code in SDVPPML 147 is not downloaded until needed for execution. In one embodiment of the present invention, software deploying server 149 performs all of the functions associated with the present invention (including execution of SDVPPML 147), thus freeing computer 101 from having to use its own internal computing resources to execute SDVPPML 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101 and/or the state of occupants and/or occupants' possessions in a self-driving vehicle (SDV). More specifically, when detecting the environment of the SDV, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 331 shown in FIG. 3), light sensors such as light sensor 329 shown in FIG. 3 for detecting how dark a roadway is, chemical sensors for detecting chemical spills on a roadway, moisture detectors, etc. that detect ambient weather conditions, traffic conditions (as detected by the cameras, microphones, etc.), and other environmental conditions of a roadway upon which the SDV is traveling. Furthermore, sensors 153 may be cameras, microphones, weight scales, etc. that detect the presence and/or state of passengers and/or their possessions while in the SDV.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

With reference now to FIG. 2, an exemplary self-driving vehicle (SDV) 202 is depicted in accordance with one or more embodiments of the present invention. Assume that SDV 202, while traveling along a roadway 203, has picked up a passenger 204 at a pick up location 206, and will deliver the passenger 204 to a drop off location 208. Assume further that the passenger 204 has put his possessions, such as the depicted luggage shown as possession 210, into the SDV 202 when passenger 204 entered SDV 202. As depicted, possession 210 may be in a lockable compartment 212 (e.g., the trunk of the SDV 202), or may be at the feet of the passenger 204, or may be sitting on the seat next to passenger 204, may be on the floor of the cabin of the SDV 204, etc. Furthermore, possession 210 may be a wallet, a purse, a smartphone, a shopping bag, a suitcase, etc. that is brought on board the SDV 202 by the passenger 204. Thus, a "possession" may be an object that is held by, carried by, or otherwise under the physical control of a user, whether held in the user's hands, within a bag carried by the user, or in a vehicle trunk or glove box of the SDV 202 and which was brought on board the SDV 202 by the user.

Figure 3:
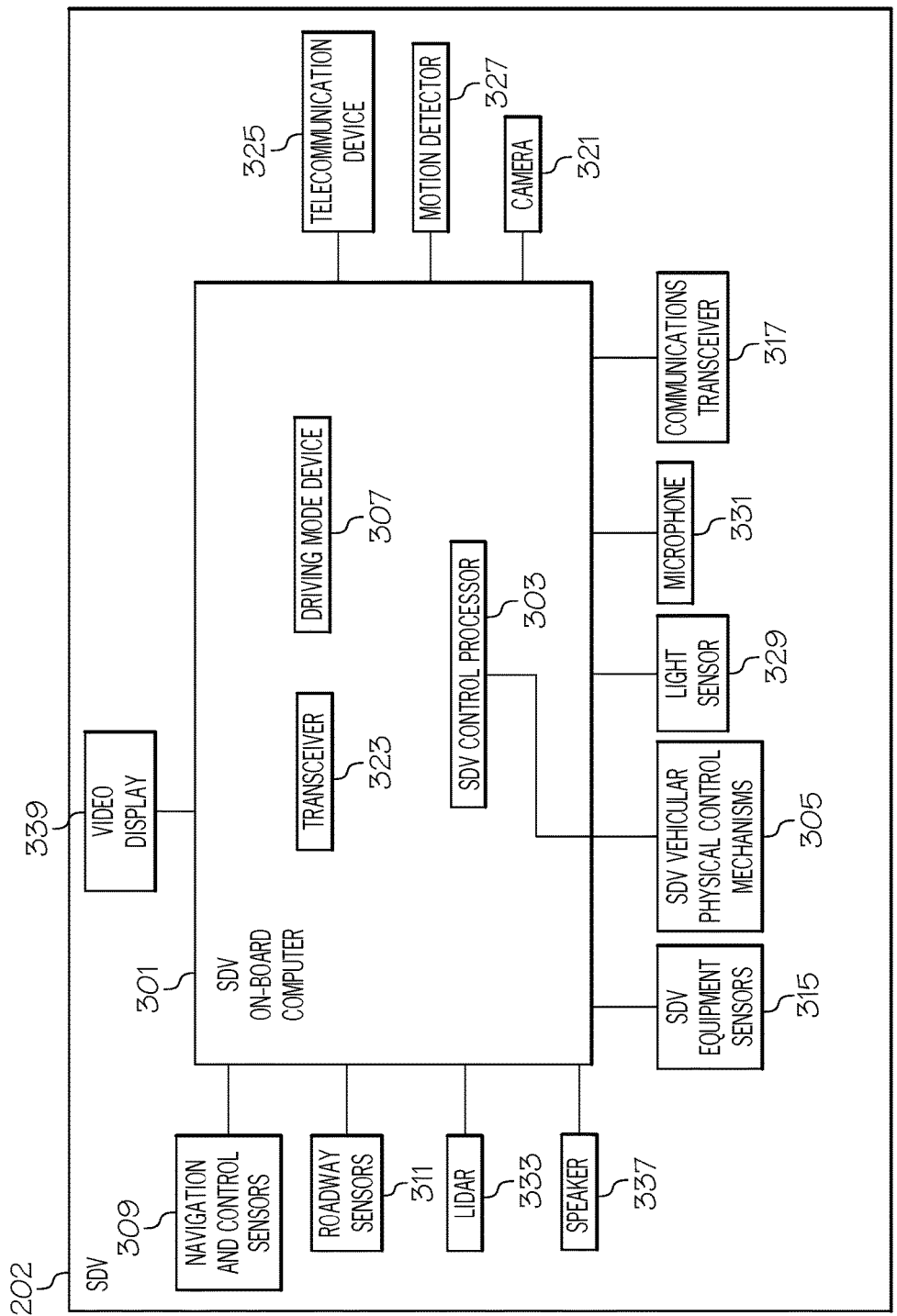
FIG. 3 depicts additional exemplary detail within an SDV in accordance with one or more embodiments of the present invention.

Lockable compartment 212 may selectively be locked and unlocked by a trunk lock 216, which is an electromechanical lock that is under the control of the possession monitoring system 214 shown in FIG. 2 and/or the SDV on-board computer 301 shown in FIG. 3.

Passengers may forget to remove or lose their possessions when they leave vehicles, including SDV 202. However, in accordance with the invention presented herein, a possession monitoring system 214 will 1) associate the possession 210 with passenger 204 (as being the owner of the possession 210), and 2) direct one or more actions to occur if the passenger 204 fails to pick up or leave with his/her possession 210 when exiting the SDV 202. More specifically, the possession monitoring system 214 is adjusted according to a passenger type (e.g., of a particular age) associated with passenger 204 and a possession type associated with possession 210 in order to modify a vigilance level V of the possession monitoring system 214, thereby creating an adjusted possession monitoring system.

The adjusted possession monitoring system 214 includes a processing system (e.g., processor 103 shown in FIG. 1), sensors (e.g., sensors 153 shown in FIG. 1), etc. that 1) determine the state of the possession 210 (e.g., whether or not it has been left behind by the passenger 204), and 2) control operations of the SDV 202 (e.g., by sending signals to the SDV on-board computer 301 shown in FIG. 3) based on the state of the possession 210.

That is, the adjusted possession monitoring system (derived from possession monitoring system 214) determines whether there is a problem with possession 210 (e.g., is left behind in the SDV 202 by passenger 204 after exiting SDV 202), and adjusts an operation of the SDV 202 accordingly (e.g., stops the SDV 202, issues an alert by the SDV 202, associates a photograph of or otherwise identifies the possession 210 and the passenger 204 in order to associate the possession 210 with the passenger 204, selectively locking/unlocking the lockable compartment 212, etc.).

With reference now to FIG. 3, additional details of one or more embodiments of the SDV 202 shown in FIG. 2 are presented.

As shown in FIG. 3, SDV 202 has an SDV on-board computer 301 that controls operations of the SDV 202. According to directives from a driving mode device 307, the SDV 202 can be selectively operated in manual mode ("human driven") or autonomous ("fully computer controlled") mode. In some embodiments, driving mode device 307 is a dedicated hardware device that selectively directs the SDV on-board computer 301 to operate the SDV 202 in one of the autonomous modes or in the manual mode.

While in autonomous mode, SDV 202 operates without the input of a human driver, such that the engine, steering mechanism, braking system, horn, signals, etc. are controlled by the SDV control processor 303, which is now under the control of the SDV on-board computer 301. That is, by the SDV on-board computer 301 processing inputs taken from navigation and control sensors 309 and the driving mode device 307 (indicating that the SDV 202 is to be controlled autonomously), then driver inputs to the SDV control processor 303 and/or SDV vehicular physical control mechanisms 305 are no longer needed.

As just mentioned, the SDV on-board computer 301 uses outputs from navigation and control sensors 309 to control the SDV 202. Navigation and control sensors 309 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 323 shown in FIG. 3), bounced off a physical structure (e.g., another car), and then received by an electromagnetic radiation receiver (e.g., transceiver 323). An exemplary positioning system within SDV 202 is a Light Detection and Ranging (LIDAR) (e.g., LIDAR 333 shown in FIG. 3) or Laser Detection and Ranging (LADAR) system that measures the time it takes to receive back the emitted electromagnetic radiation (e.g., light), and/or evaluates a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301. In one or more embodiments, different SDVs are able to directly communicate with one another in order to let one another know their relative positions. That is, a first SDV may transmit its GPS coordinates to a second SDV (and vice versa), thus allowing the first SDV and the second SDV to know the current real-time GPS-coordinate location of the other SDV.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

In one or more embodiments of the present invention, SDV 202 includes roadway sensors 311 that are coupled to the SDV 202. Roadway sensors 311 may include sensors that are able to detect the amount of water, snow, ice, etc. on the roadway 203 (e.g., using cameras, heat sensors, moisture sensors, thermometers, etc.). Roadway sensors 311 also include sensors that are able to detect "rough" roadways (e.g., roadways having potholes, poorly maintained pavement, no paving, etc.) using cameras, vibration sensors, etc. Such sensor readings may aid the possession monitoring system 214 shown in FIG. 2 in determining the location of the possession 210 (e.g., if the possession 210 slid under the seat of the passenger 204 due to the SDV 202 being jostled by a rough road). Roadway sensors 311 may also include sensors that are also able to detect how dark the roadway 203 is using light sensors.

In one or more embodiments of the present invention, a camera 321 can be movably trained on roadway 203, in order to provide photographic images of conditions on the roadway 203 upon which the SDV 202 is traveling. In one or more embodiments of the present invention, the camera 321 will compare real-time images of roadway 203 with past images of roadway 203, in order to determine any changes to the condition of the roadway 203.

In one or more embodiments of the present invention, camera 321 can also be trained on passenger possessions (e.g., possession 210 shown in FIG. 2) during loading, transporting, and unloading. That is, camera 321 can take a still photo or a video of passenger possessions as they are loaded onto the SDV 202 at pickup location 206 shown in FIG. 2, while they are in transit along roadway 203, and while they are being unloaded at delivery location 208, thus providing a continuous record of the movement and location of the possessions. Thus, one or more cameras (camera 321) can capture images both within and outside of the SDV 202, including images of the SDV passengers as well as their possession(s).

In one or more embodiments of the present invention, camera 321 can be trained on a location (e.g., pickup location 206 or delivery location 208 shown in FIG. 2) and/or a person (e.g., passenger 204) while the passenger possession 210 is being loaded, transported, and/or removed from SDV 202. This feature provides a record of the passenger possession 210 being picked up at pickup location 206 and taken by the passenger when he/she departs from delivery location 208, as well as a record of the movement of the passenger possession 210 while in the possession of the passenger 204 and in transit between pickup location 206 and delivery location 208.

In one or more embodiments of the present invention, also within the SDV 202 are SDV equipment sensors 315. SDV equipment sensors 315 may include cameras aimed at tires on the SDV 202 to detect how much tread is left on the tire. SDV equipment sensors 315 may include electronic sensors that detect how much padding is left of brake calipers on disk brakes. SDV equipment sensors 315 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 315 may include sensors that detect the condition of other components of the SDV 202, including lights (e.g., using circuitry that detects if a bulb is broken), wipers (e.g., using circuitry that detects a faulty wiper blade, wiper motor, etc.), etc. Thus, in one or more embodiments of the present invention, if the SDV 202 is suffering from a certain deficiency such as having tires with little tread remaining, then the monitoring computer 201 may prevent the SDV 202 from picking up a fragile passenger possession (e.g., a chandelier that may break if the SDV 202 suffers a blowout). Similarly, if the SDV equipment sensors detect that the engine is overheating and the SDV 202 is likely to be delayed when traveling from pickup location 206 to delivery location 208, then the monitoring computer 201 may prevent the SDV 202 from picking up a perishable passenger possession (e.g., medicine that cannot be exposed to heat for more than two hours) from pickup location 206 for delivery to location 208. Based on these factors (i.e., road conditions, SDV 202 conditions, fragility of the passenger possession 210), logic within the SDV 202 and/or monitoring computer 201 may decide whether or not to even pick up the passenger possession 210, based on whether doing so would place the passenger possession 210 at an undue risk or being damaged during transit.

In one or more embodiments of the present invention, also within SDV 202 is a communications transceiver 317, which is able to receive and transmit electronic communication signals (e.g., RF messages) from and to other communications transceivers found in other vehicles, servers, monitoring computers, etc.

In one or more embodiments of the present invention, also within SDV 202 is a telecommunication device 325 (e.g., a smart phone, a cell phone, a laptop computer, etc.), which may be connected (e.g., via Bluetooth™ connection) to the SDV on-board computer 301.

In one or more embodiments of the present invention, also within SDV 202 is a motion detector 327, which detects movement of the passenger 204 and/or the possession 210 (e.g., using an optical, microwave, or acoustic sensor that detects movement based on changes in the optical, microwave, or acoustic field).

In one or more embodiments of the present invention, also within SDV 202 is a speaker 337, which is able to broadcast arrival notices (e.g., a synthesized voice alert) that let passenger 204 know that SDV 202 has arrived at drop off location 208.

In one or more embodiments of the present invention, also attached to the SDV 202 is a video display 339 that is able to display arrival notices (e.g., a text message board, flashing light, etc.) that lets passenger 204 know that SDV 202 has arrived at drop off location 208. In an embodiment of the present invention, the video display 339 displays a message regarding features of the possession 210 that the passenger 204 brought on board the SDV 202, thus reminding the passenger 204 what items need to be in his/her possession when exiting the SDV 202. In an embodiment, upon arriving at the drop off location 208, an interior cabin light within SDV 202 is turned on, in order to provide the SDV passenger 204 with enough light to notice and/or find his/her possession 210 within the cabin of the SDV 202.

Therefore, one or more embodiments of the present invention utilizes a self-driving vehicle (SDV), a means for the SDV to assess a passenger and passenger luggage (or other belongings/possessions), and based on this assessment, the SDV determines a problem associated with luggage/objects in the passenger's possession. Thereafter, based on the nature of the problem, the SDV takes an amelioration action in order to prevent the SDV passenger from losing or otherwise leaving behind his/her possessions upon leaving the SDV.

In one or more embodiments of the present invention, the SDV utilizes a subsystem (local or on the cloud) that learns what kinds of passengers (cohorts) are more apt to leave items behind (e.g. elderly people, children, people that are rushed, etc.) and then adjusts its sensitivity and risk assessment accordingly. Thus, this additional individual or cohort information can be used to boost an SDV vigilance level V, with respect to how sensitive the SDV is to detecting and addressing belongings that are dropped on the floor, left behind in trunks and seats, etc. The vigilance level V may vary between neighborhoods, times of year (e.g. seasons), holidays, days of the week, time of day (including brightness of day and darkness of night), weather, cognitive state of passenger, trip destinations (train station, airport), etc. Cognitive states can be estimated, with confidence level C, based on facial expressions, distraction levels (e.g., looking outside or staring at some device, talking with others, listening to music, continually talking, etc.).

In one or more embodiments of the present invention, the estimation of the SDV passenger's cognitive state is based on a distraction level of the SDV passenger. That is, various current distraction levels (e.g., caused by the SDV passenger looking outside of the SDV or staring at some handheld device such as a phone, talking with others, listening to music, continually talking, a commotion outside the SDV, etc.) are identified (e.g., by the SDV passenger), quantified (i.e., assigned a value), and weighted (using predefined weighting values). These identified and weighted quantified values provide a value that, when compared to a predetermined value (e.g., as established by historical trials), leads to a distraction level of the SDV passenger. Based on this determined distraction level, the vigilance level of the system (e.g., monitoring and alert generation using logic within monitoring computer 201) is adjusted in order to ensure that any misplaced (or left behind) possessions of the SDV passenger are identified.

The luggage assessment may include any of: number, size, shape, color, weight, nature of object (e.g. wallet, handbag, smartphone dropped to floor or left in trunk, etc.), and this assessment may be performed by optical scanners, weight scanners, deep neural nets with image input, image classifiers, motion detectors, etc. The sensitivities of various assessments, and nature of various assessments employed and their algorithms, may be altered by the vigilance level V. The assessment could compare, for instance, what was in the trunk before a given passenger put his/her belongings there, and after the passenger disembarks. In another embodiment, the system will weigh the belongings in the trunk before a passenger is picked up, then after the passenger put his/her luggage in the trunk, and again after the passenger disembarks. The difference in weight may be one of several metrics used to determine that an item was left in the trunk or a passenger with no luggage removed someone else's luggage, etc.

The person assessment may involve any of: person's ID, person's characteristics, face recognition, ID badge recognition, smartphone recognition, etc.

The problem may be any of: leaving luggage behind in trunk, dropping an item on a seat or floor, packing efficiently/inefficiently in a trunk, driving away with luggage still in the SDV, theft, the wrong person accidentally taking the wrong package, etc.

The amelioration action includes SDV providing alerts or instructions to passengers, sending an alert signal to a third party, taking a photograph, etc.

The system may check to see that an item (e.g., a bag) with a certain physical identity is released from the vehicle when it is being picked up by the person of the physical identity to which it is bound, or associated. This system may utilize facial recognition, visual identification of luggage using deep neural nets, etc. Appropriate alerts are then given. For example, if someone does leave the SDV without belongings, a phone call may be made immediately to his/her smartphone.

A bag may be bound to (associated with) a passenger when the bag is placed, when the passenger sits, when the person opens a door, etc.

A passenger's weight, and other physical dimensions may be recorded (e.g. when sitting). The bag's weight, physical dimensions, color, pattern, etc. may be recorded when placed.

The passenger, before he/she reaches the SDV, may take a photograph/selfie with the bags in full view and send it to the car. Or the SDV may do this automatically or upon request. When the passenger picks up the luggage, he/she takes a photograph/selfie/videos with the bag—the car then matches photographs, and physical identities, and allows the luggage to the taken by the passenger.

For example, consider the following use case. A passenger is carrying a bag with a computer. He sits in the SDV with it. The SDV (or more specifically the possession monitoring system 214 shown in FIG. 2) scans his face and attempts to record the visual appearance of the bag. If the passenger does not want his face scanned, he may offer a badge or a communication with his smartphone or smartwatch or other enabled device. When the passenger exits the SDV, the SDV will not drive away without the passenger taking the computer bag or without providing several warnings first. Some warnings may be sent to his smartphone. If desired, the ID of the SDV may be recorded on the passenger's cell phone, and aspects of the passenger's ID may be recorded by the SDV. This may act as a receipt to provide essential information in lost and found cases. This information may include an SDV number, the name of the company that operates the SDV, etc.

In various embodiments, when an item is forecast to be left behind by a passenger, an alarm device for taxi passengers may take the form of the SDV speaking to the passengers and/or flashing lights when a users reaches a location, leaves his/her seat, opens a door, etc.

In various embodiments, the system can take a picture of the back seat before and after a passenger gets in. It detects whether an item is left behind and then takes triggered actions. Such triggered actions may include: sounds an alarm to notify the passenger and driver that there is something in the back seat that wasn't there at the beginning of the ride, stopping the SDV from driving for a period of N minutes, flashing a light on the exterior or interior of the door or SDV, talking to the passenger, honking the horn in a particular pattern, driving to a lost-and-found center, etc.

For identification of luggage, IDs may be used in image and video analysis.

In one or more embodiments, the SDV may also park in a useful manner that allows the luggage to be loaded or unloaded. The SDV may also determine, using contextual and luggage and passenger information, when to drive away after the luggage has been unloaded. If the luggage has to be delegated to be collected by another passenger or person not in the car, the SDV may note identifications of such passengers. Truck lids and/or doors may also be locked, closed, unlocked, and/or opened based on luggage type, passenger type, whether the door should be opened for a longer duration, and so forth.

Figure 4:
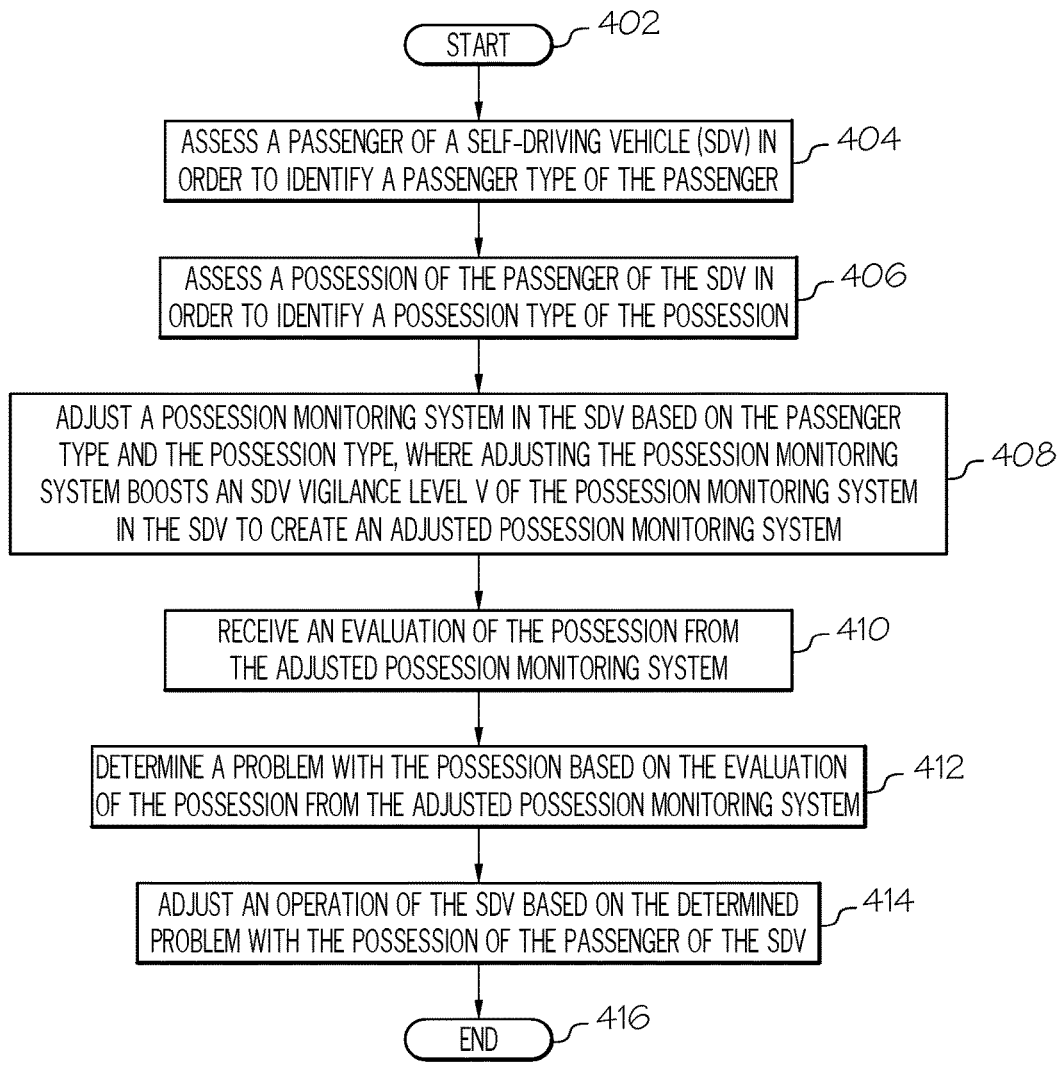
FIG. 4 is a high-level flow chart illustrating a process in accordance with one or more embodiments of the present invention.

With reference now to FIG. 4, a high-level flow chart of one or more steps performed by one or more processors and other hardware devices to manage a possession of a passenger of a self-driving vehicle is presented in accordance with one or more embodiments of the present invention.

After initiator block 402, one or more processors (e.g., within possession monitoring system 214) assess a passenger (e.g., passenger 204) of a self-driving vehicle (SDV 202) in order to identify a passenger type of the passenger, as described in block 404. That is, the passenger type may be based on the passenger's identity (i.e., a profile of the passenger as being one who has a history of leaving belongings such as possession 210 on public transportation such as SDV 202); a passenger's visible characteristics (e.g., as being of a certain age range, having sensory limitations, etc.); etc.

As described in block 406, one or more processors also assess a possession (e.g., possession 210) of the passenger of the SDV in order to identify a possession type of the possession. The possession type may be based on the physical appearance of the possession (e.g., its size, shape, color, weight, etc.) and/or its purpose (e.g., a purse for carrying money, a computer bag for carrying a computer, etc.).

In one or more embodiments of the present invention, the possession assessment is achieved by receiving, by one or more processors, sensor readings from sensor(s) in order to determine the possession type. For example, the sensor(s) may be an optical scanner (e.g., a camera with image analytical abilities to identity the type of item being photographed), a weight scale, a deep neural net that uses an image input of the possession (e.g., image analysis), and a motion detector (for detecting bounce and other movement indicative of certain weights).

As described in block 408 of FIG. 4, one or more processors then adjust a possession monitoring system (e.g., possession monitoring system 214) in the SDV based on the passenger type and the possession type. That is, adjusting the possession monitoring system modifies an SDV vigilance level V of the possession monitoring system in the SDV to create an adjusted possession monitoring system.

For example, if the passenger 204 is a distracted person who is staring out the window (the passenger type) and the possession is a small wallet (the possession type), then the SDV vigilance level V will be high, such that the possession monitoring system 214 will closely track the possession for any signs of being dropped, sliding below the seat, etc. However, if the passenger 204 is a person working on his/her laptop computer (the passenger type) and the possession is the laptop computer (the possession type), then the SDV vigilance level V will be low, since the possession monitoring system 214 does not need to closely track the possession since it is always in the lap of the passenger.

In other embodiments/examples, one or more processors boost (i.e., increase) the SDV vigilance level V based on a current time of year (e.g., a holiday season), a current level of darkness around the SDV (e.g., nighttime, unlit streets, broad daylight, etc.), current weather conditions around the SDV (e.g., rainy, snowy, etc.), a current time of day, and a cognitive state of the passenger.

As described in block 410, one or more processors then receive an evaluation of the possession from the adjusted possession monitoring system (e.g., where it is located, if it is use by the passenger, its size, etc.).

As described in block 412, one or more processors determine a problem with the possession based on the evaluation of the possession from the adjusted possession monitoring system.

For example and in various embodiments of the present invention, the problem with the possession may be the passenger leaving the possession in the SDV while the SDV drives away from the passenger, the passenger inadvertently dropping the possession inside the SDV, the passenger inefficiently packing the possession in a trunk of the SDV (e.g., such that it takes up too much room and/or exposes itself to damage from being improperly secured), and an unauthorized party taking the possession from the SDV.

As described in block 414, one or more processors (e.g., within SDV on-board computer 301) then adjust an operation of the SDV based on the determined problem with the possession of the passenger of the SDV.

In various embodiments of the present invention, adjusting the operation of the SDV may be providing an alert to the passenger (e.g., an aural/visual alert letting the passenger know that he/she is exiting the SDV without his possession, sending the passenger a text message letting the passenger know that he/she left his/her possession within the SDV 202, etc.); sending an alert to a third party (e.g., letting monitoring computer 201 in FIG. 2 know that the passenger 204 left the SDV 202 without his possession 210); taking a photograph of the possession (for future identification and reclamation); stopping the SDV for a predetermined length of time (e.g., preventing the SDV 202 from driving away for 5 minutes in order to give the passenger 204 time to realize that he/she left the possession in the SDV 202 and to retrieve it before the SDV 202 drives away); flashing a light on the SDV (in order to alert the exiting passenger 204 that he/she is leaving the possession 210 in the SDV 202); issuing an audible sound on the SDV (in order to alert the exiting passenger 204 that he/she is leaving the possession 210 in the SDV 202); and/or driving the SDV to a lost-and-found center (in order to drop off the possession 210 for future retrieval by the passenger 204).

The flow chart ends at terminator block 416.

In an embodiment of the present invention, a camera (e.g., camera 321 when incorporated into possession monitoring system 214) photographs the passenger (e.g., passenger 204) and the possession (e.g., possession 210) as the passenger enters the SDV (e.g., SDV 202). One or more processors (e.g., within the possession monitoring system 214) detect that the passenger is leaving the SDV (e.g., as detected by motion detector 327).

One or more processors also detect that one or more objects are being carried by the passenger while leaving the SDV. That is, a camera (e.g., camera 117) within possession monitoring system 214 will photograph the object (which may or may not be the possession 210 that the passenger 204 entered the SDV 204 with) in the hands of the passenger 204 as the passenger 204 leaves the SDV 202.

One or more processors compare the photographed possession of the passenger and the object. That is, the one or more processors compare photographic images of what the passenger was carrying when he/she entered the SDV to what the passenger was carrying when he/she exited the SDV.

In response to determining that the photographed possession and the object are not the same item (i.e., the passenger left the SDV with an object that he/she did not bring on board the SDV), then one or more processors issue a possession alert (e.g., a local alarm, a message to the monitoring computer 201, etc.).

In an embodiment of the present invention, the possession is stored in a locked compartment (e.g., lockable compartment 212) of the SDV, and adjusting the operation of the SDV involves selectively locking and unlocking the locked compartment. For example, the trunk lock 216 is unlocked by the SDV on-board computer 301 only if 1) the SDV 202 has reached the drop off location 208 and 2) the possession 210 was brought on board the SDV 202 by the passenger 204.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
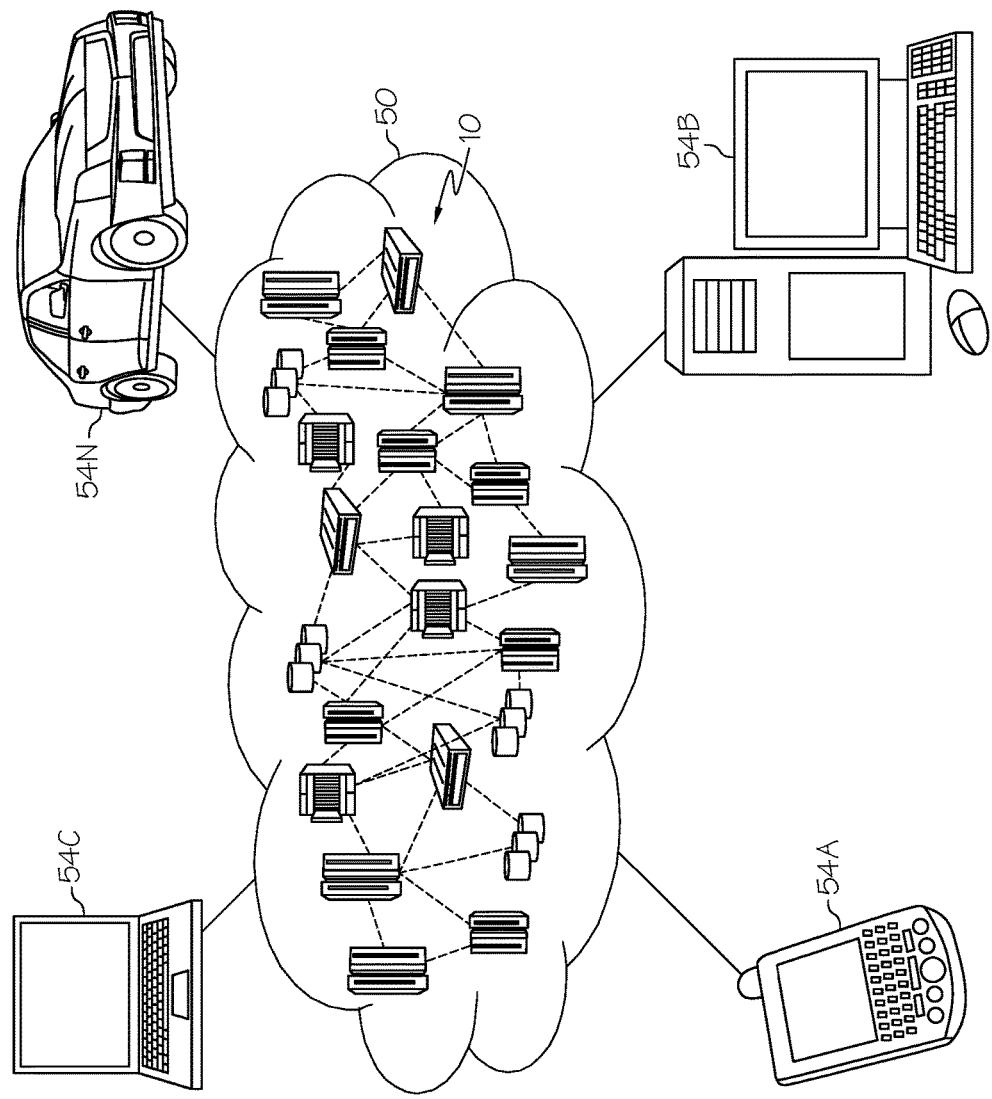
FIG. 5 depicts a cloud computing environment according to an embodiment of the present invention.

Referring now to FIG. 5, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 5 are intended to be illustrative only and that computing nodes 10 and cloud computing environment 50 can communicate with any type of computerized device over any type of network and/or network addressable connection (e.g., using a web browser).

Figure 6:
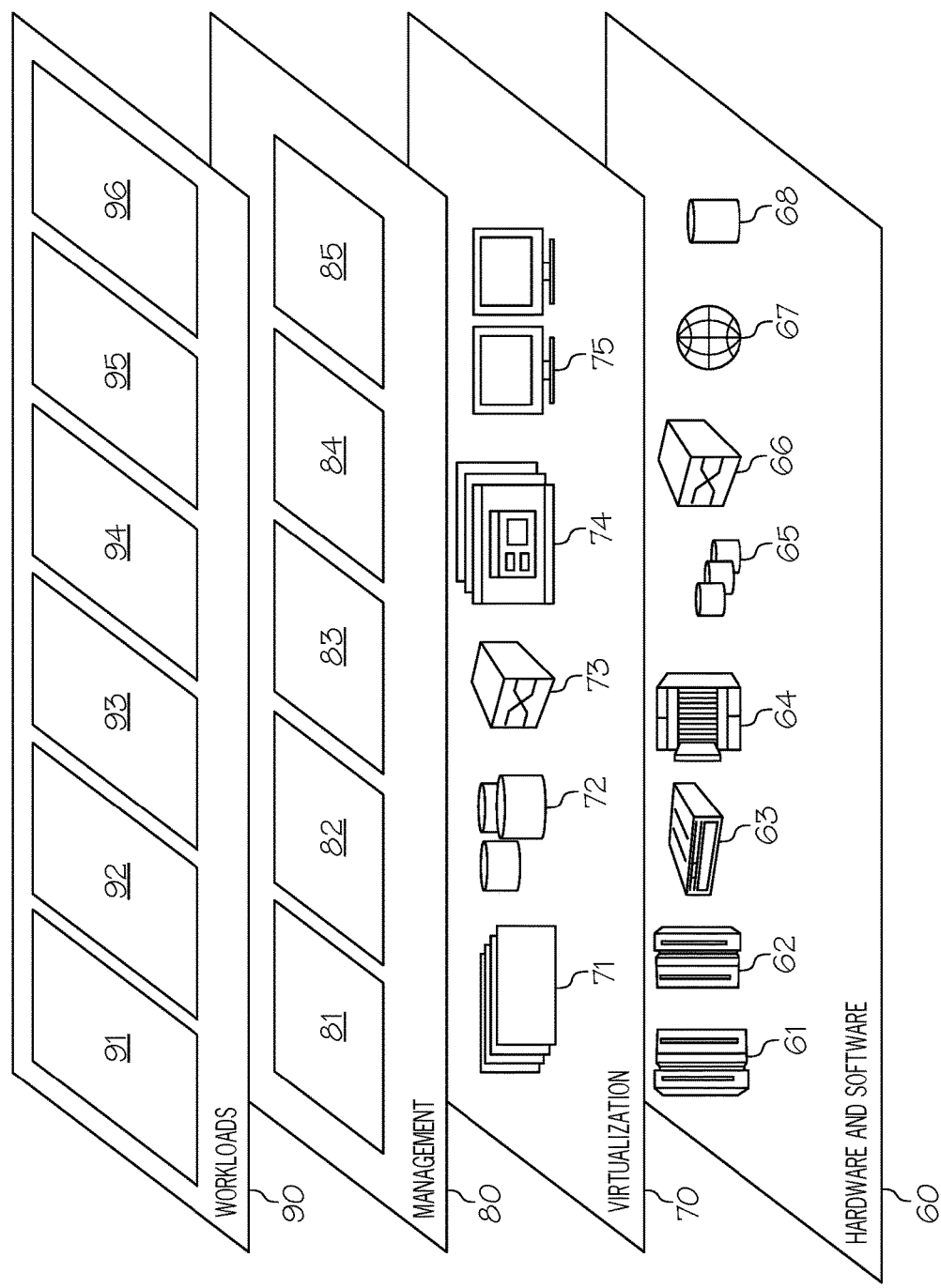
FIG. 6 depicts abstraction model layers of a cloud computing environment according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and SDV luggage management processing 96, in accordance with one or more embodiments of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

The present invention may be implemented through the use of a Very High Speed Integrated Circuit (VHSIC) Hardware Description Language (VHDL) program. VHDL is an exemplary design-entry language for describing an integrated circuit, such as a Field Programmable Gate Arrays (FPGA), Application Specific Integrated Circuit (ASIC), and other similar electronic devices. In other words and by way of example only, a software-implemented method according to one or more embodiments of the present invention may be emulated by a hardware-based VHDL program, which is then implemented in an VHSIC, such as a FPGA.

Having thus described embodiments of the present invention, in detail and by reference to illustrative embodiments thereof, it will be apparent that modifications and variations are possible without departing from the scope of the present invention defined in the appended claims.

What is claimed is:

1. A computer-implemented method of managing a possession of a passenger of a self-driving vehicle, the computer-implemented method comprising:
   assessing, by one or more processors, the passenger of the self-driving vehicle (SDV) in order to identify a passenger type of the passenger;
   assessing, by one or more processors, the possession of the passenger of the SDV in order to identify a possession type of the possession;
   adjusting, by one or more processors, a possession monitoring system in the SDV based on the passenger type and the possession type, wherein adjusting the possession monitoring system modifies an SDV vigilance level (V) of the possession monitoring system in the SDV to create an adjusted possession monitoring system;
   receiving, by one or more processors, an evaluation of the possession from the adjusted possession monitoring system;
   determining, by one or more processors, a problem with the possession based on the evaluation of the possession from the adjusted possession monitoring system;
   adjusting, by one or more processors, an operation of the SDV based on the determined problem with the possession of the passenger of the SDV; and
   boosting, by one or more processors, the SDV vigilance level (V) based on one or more factors from a group consisting of a current time of year, a current level of darkness around the SDV, current weather conditions around the SDV, a current time of day, and a cognitive state of the passenger.

2. The computer-implemented method of claim 1, wherein the possession type is based on one or more possession qualities from a group consisting of size, shape, color, weight, and purpose of the possession, and wherein the computer-implemented method further comprises:
   receiving, by one or more processors, sensor readings from sensors in order to determine the possession type, wherein the sensors are from a group of sensors consisting of an optical scanner, a weight scale, a deep neural net that uses an image input of the possession, and a motion detector.

3. The computer-implemented method of claim 1, wherein the passenger type is determined based on one or more passenger features from a group consisting of a passenger's identity and a passenger's visible characteristics.

4. The computer-implemented method of claim 1, wherein the problem with the possession is one or more problems from a group consisting of the passenger leaving the possession in the SDV as the SDV drives away from the passenger, the passenger inadvertently dropping the possession inside the SDV, the passenger inefficiently packing the possession in a trunk of the SDV, and an unauthorized party taking the possession from the SDV.

5. The computer-implemented method of claim 1, wherein the adjusting the operation of the SDV is one or more actions from a group consisting of providing an alert to the passenger, sending an alert to a third party, taking a photograph of the possession, stopping the SDV for a predetermined length of time, flashing a light on the SDV, issuing an audible sound on the SDV, and driving the SDV to a lost-and-found center.

6. The computer-implemented method of claim 1, further comprising:
   photographing, by a camera on the SDV, the passenger and the possession as the passenger enters the SDV;
   detecting, by one or more processors, that the passenger is leaving the SDV;
   detecting, by one or more processors, that an object is being carried by the passenger while leaving the SDV;
   comparing, by one or more processors, the photographed possession of the passenger and the object; and
   in response to determining that the photographed possession and the object are not a same item, issuing, by one or more processors, a possession alert.

7. The computer-implemented method of claim 1, wherein the possession is stored in a locked compartment of the SDV, and wherein adjusting the operation of the SDV comprises selectively locking and unlocking the locked compartment.

8. A computer program product for managing a possession of a passenger of a self-driving vehicle, the computer program product comprising a computer readable storage device having program instructions embodied therewith, the program instructions readable and executable by a computer to perform a method comprising:
   assessing the passenger of the self-driving vehicle (SDV) in order to identify a passenger type of the passenger;
   receiving sensor readings from sensors in order to determine a possession type of the possession, wherein the sensors are from a group of sensors consisting of an optical scanner, a weight scale, a deep neural net that uses an image input of the possession, and a motion detector, and wherein the possession type is based on one or more possession qualities from a group consisting of size, shape, color, weight, and purpose of the possession;
   assessing the possession of the passenger of the SDV in order to identify the possession type of the possession;
   adjusting a possession monitoring system in the SDV based on the passenger type and the possession type, wherein adjusting the possession monitoring system modifies an SDV vigilance level (V) of the possession monitoring system in the SDV to create an adjusted possession monitoring system;
   receiving an evaluation of the possession from the adjusted possession monitoring system;

determining a problem with the possession based on the evaluation of the possession from the adjusted possession monitoring system; and adjusting an operation of the SDV based on the determined problem with the possession of the passenger of the SDV.

9. The computer program product of claim 8, wherein the method further comprises:

boosting the SDV vigilance level (V) based on one or more factors from a group consisting of a current time of year, a current level of darkness around the SDV, current weather conditions around the SDV, a current time of day, and a cognitive state of the passenger.

10. The computer program product of claim 8, wherein the passenger type is determined based on one or more passenger features from a group consisting of a passenger's identity and a passenger's visible characteristics.

11. The computer program product of claim 8, wherein the problem with the possession is one or more problems from a group consisting of the passenger leaving the possession in the SDV while the SDV drives away from the passenger, the passenger inadvertently dropping the possession inside the SDV, the passenger inefficiently packing the possession in a trunk of the SDV, and an unauthorized party taking the possession from the SDV.

12. The computer program product of claim 8, wherein the adjusting the operation of the SDV is one or more actions from a group consisting of providing an alert to the passenger, sending an alert to a third party, taking a photograph of the possession, stopping the SDV for a predetermined length of time, flashing a light on the SDV, issuing an audible sound on the SDV, and driving the SDV to a lost-and-found center.

13. The computer program product of claim 8, wherein the method further comprises:

photographing, by a camera on the SDV, the passenger and the possession as the passenger enters the SDV;

detecting that the passenger is leaving the SDV;

detecting that an object is being carried by the passenger while leaving the SDV;

comparing the photographed possession of the passenger and the object; and in response to determining that the photographed possession and the object are not a same item, issuing a possession alert.

14. The computer program product of claim 8, wherein the program instructions are executable by the device to cause the device to provide a service in a cloud environment.

15. A system comprising:

one or more processors;

one or more computer readable memories operably coupled to the one or more processors; and one or more computer readable storage mediums having program instructions stored on at least one of the one or more storage mediums for execution by at least one of the one or more processors via at least one of the one or more memories, the stored program instructions comprising:

program instructions to assess a passenger of a self-driving vehicle (SDV) in order to identify a passenger type of the passenger;

program instructions to assess a possession of the passenger of the SDV in order to identify a possession type of the possession;

program instructions to adjust a possession monitoring system in the SDV based on the passenger type and the possession type, wherein adjusting the possession monitoring system modifies an SDV vigilance level (V) of the possession monitoring system in the SDV to create an adjusted possession monitoring system;

program instructions to receive an evaluation of the possession from the adjusted possession monitoring system;

program instructions to determine a problem with the possession based on the evaluation of the possession from the adjusted possession monitoring system;

program instructions to adjust an operation of the SDV based on the determined problem with the possession of the passenger of the SDV;

program instructions to photograph, by a camera on the SDV, the passenger and the possession as the passenger enters the SDV;

program instructions to detect that the passenger is leaving the SDV;

program instructions to detect that an object is being carried by the passenger while leaving the SDV;

program instructions to compare the photographed possession of the passenger and the object; and program instructions to, in response to determining that the photographed possession and the object are not a same item, issue a possession alert.

16. The system of claim 15, further comprising:

program instructions to boost the SDV vigilance level (V) based on one or more factors from a group consisting of a current time of year, a current level of darkness around the SDV, current weather conditions around the SDV, a current time of day, and a cognitive state of the passenger.

17. The system of claim 15, wherein the possession type is based on one or more possession qualities from a group consisting of size, shape, color, weight, and purpose of the possession, and wherein the system further comprises:

program instructions to receive sensor readings from sensors in order to determine the possession type, wherein the sensors are from a group of sensors consisting of an optical scanner, a weight scale, a deep neural net that uses an image input of the possession, and a motion detector.

* * * * *